Dec. 23, 1958 P. ESCAUT Re. 24,581

CONVERTIBLE UTENSIL

Original Filed Dec. 12, 1955 2 Sheets-Sheet 1

INVENTOR
PAUL ESCAUT

BY Irwin S. Thompson
ATTORNEY

CONVERTIBLE UTENSIL

Original Filed Dec. 12, 1955 2 Sheets-Sheet 2

INVENTOR
PAUL ESCAUT

BY Irvin S. Thompson
ATTORNEY

United States Patent Office

Re. 24,581
Reissued Dec. 23, 1958

24,581

CONVERTIBLE UTENSIL

Paul Escaut, Beziers, France

Original No. 2,812,098, dated November 5, 1957, Serial No. 552,525, December 12, 1955. Application for reissue December 27, 1957, Serial No. 706,231

Claims priority, application France June 22, 1955

1 Claim. (Cl. 220—19)

Matter enclosed in heavy brackets [ ] appears in the original patent but forms no part of this reissue specification; matter printed in italics indicates the additions made by reissue.

This invention relates to a utensil which is adapted to be converted to perform various duties as a domestic appliance.

The utensil of the present invention essentially comprises two metal circles connected together by two series of U-shaped wires, the crossing branches of which are hooked to said metal circles, while their cross-pieces are articulated together. One of these metal circles is filled in to constitute a wire bottom. The other circle remains open and can be fitted with handles and various attachments.

In the utensil thus constituted, the two circles can easily be moved apart or towards one another, the U-shaped elements pivoting at their articulations and at the same time on their fastenings on the circles, while these transformations are also permitted by the elasticity of the U-shaped wires.

As a result, the utensil when opened out can constitute a basket, a salad drainer, or other article, while when folded it can form a dish carrier. It can also be given various other forms permitting its use as a biscuit plate, a fruit washer, and so on.

In order to enable the invention to be more readily understood, reference is made to the accompanying drawings which illustrate diagrammatically and by way of example one embodiment of the utensil in accordance therewith viewed in various forms.

Figure 1:
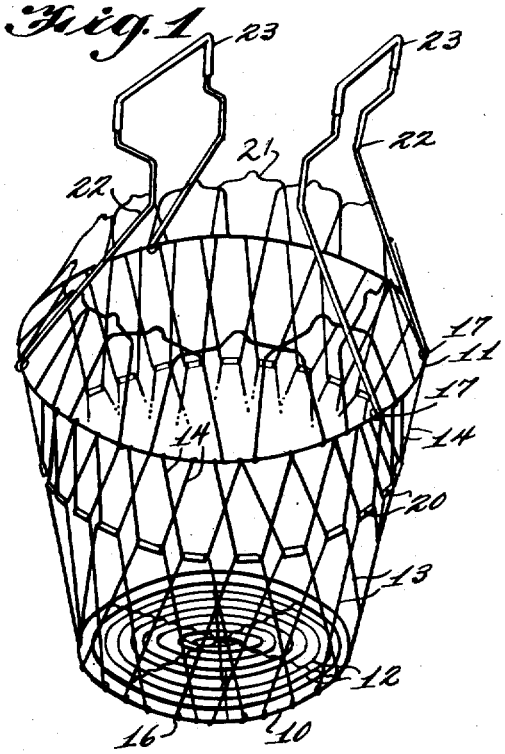
Figure 1 shows the utensil as a salad drainer.
Figure 2:
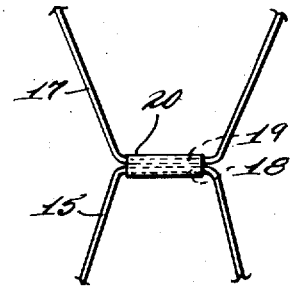
Figures 2 and 2a show details of the assembly.
Figure 2A:
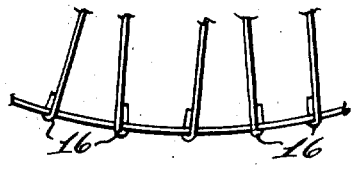

The utensil of the invention is composed of two metal circles 10 and 11 connected by U-shaped wire elements. The circle 10 can be provided with a bottom 12. This bottom can be constituted in the usual manner for metal baskets and hooked by its radial wires to the circle 10. It may also be made of perforated or other metal and can be bare, painted, or decorated. The circle 11 has a larger diameter than the circle 10. To the circle 10 are attached wire elements 13 in the shape of a widened-out U, while to the circle 11 are attached other similar wire elements 14 in the shape of a widened-out U.

The elements 13 are attached at 15 by the ends of their limbs 16 to the circle 10 by simply bending over the wire. Similarly, the limbs 17 of the elements 14 are attached to the circle 10.

The cross-bars 18 of the elements 13 and the cross-bars 19 of the elements 14 are inserted together into a tubular element 20, which thus holds the elements 13 and 14 while permitting them to pivot. In other words, the parts 18—19—20 constitute an articulation for the elements 13 and 14.

The aforedescribed assembly thus forms a basket capable of being folded substantially into one plane or unfolded in the form of a truncated cone.

To the circle 11 are attached other elements 21 articulated on the former and crossing one another.

In addition, rods 22 of handles 23 are likewise attached to the circle 10. One of the rods 22 of each handle passes above the elements 21, while the other passes behind said elements.

When opened out as shown in Figure 1, the utensil constitutes a basket, which can in particular be used for draining salads. The elements 13 and 14, being substantially in line with one another, are disposed to form a truncated cone closed at its bottom part by the open-work bottom 12. When the handles 23 are brought together, the elements 21 are folded over obliquely and form a partial closure of the top aperture formed by the circle 11. When the handles 23 are moved apart, the elements 21 are moved away by the rods 22, and thus the basket can be opened for filling or empting.

Figure 3:
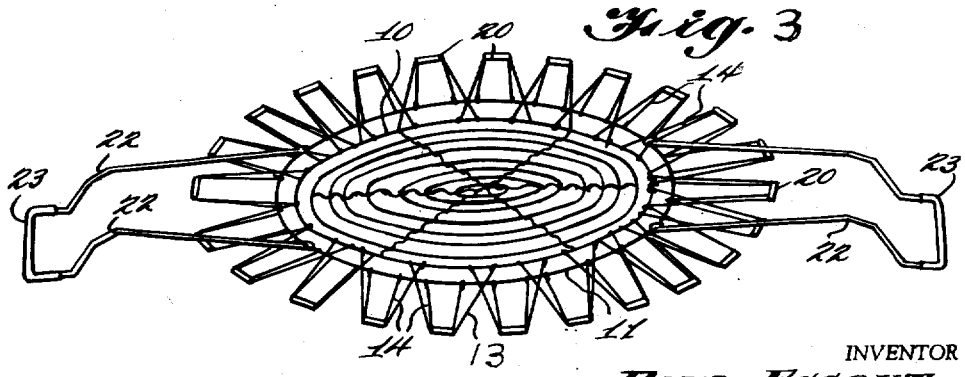
Figure 3 shows the utensil converted into a dish support.

Bu pushing the articulations 20 outwards, the elements 13 and 14 can be folded over one another into the plane of the bottom 12. By inverting the utensil, the form illustrated in Figure 3 is obtained, which constitutes a dish carrier, which can advantageously be used for introducing dishes or other cooking utensils into a hot oven.

Figure 4:
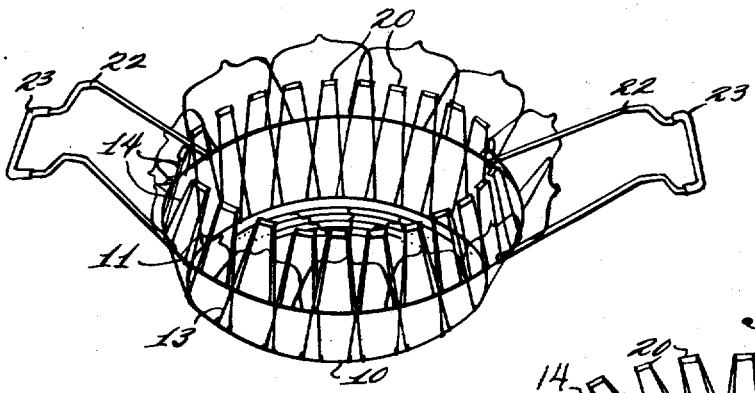
Figures 4 to 7 show the utensil converted into various other forms.

Another transformation (Figure 4) consists in standing up the elements 13 in relation to the bottom, so that they assume the form of a cylinder, while the elements 14 folded outwards constitute a truncated conical element. The elements 21 and the handles 23 can then be brought into the vertical position, or the horizontal or oblique positions, depending on the decorative effects desired. A stand for fruit, biscuit, or the like is thus formed.

Figure 5:
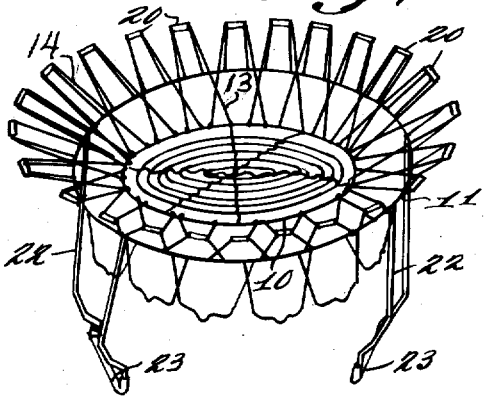

By folding over the handles 23, as illustrated in Figure 5, a drainer is formed, which is suspended on the handles 23 which serve as support.

Figure 6:
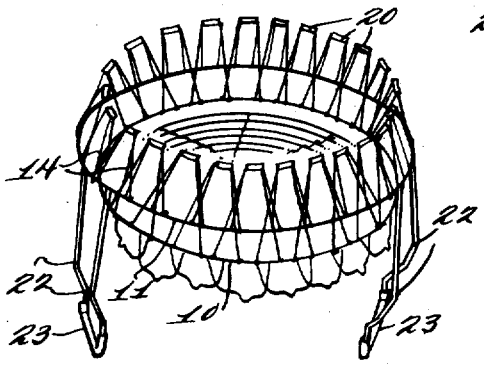

In another position, the elements 13 and 14 are superimposed (Figure 6) and held by the handles 22—23, which are disposed vertically to form a stand for supporting objects, or else a basket which can be used with a deep frier. In the same position, but with the elements 13 and 14 moved apart, a steamer can be formed the diameter of which is variable to fit any container.

Figure 7:
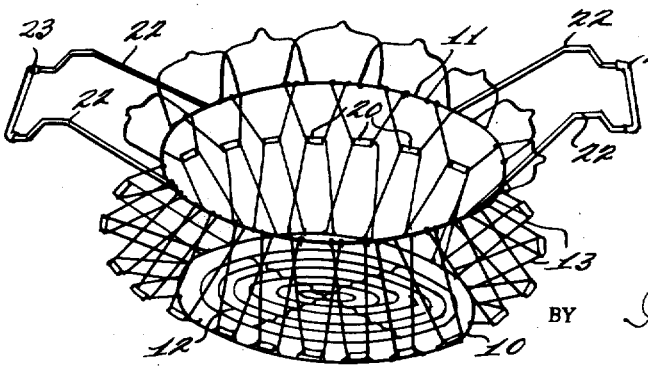

Figure 7 shows the utensil illustrated in Figure 1, with the elements 13 and 14 partially moved apart on the articulations 20. This constitutes a basket of variable diameter, for which there are various uses.

As can be seen, the same utensil, which is simple and inexpensive to manufacture, can be used for various domestic or decorative services. It can be used for one or more of the purposes hereinbefore indicated, or else serve as a frying basket, a flower stand, a flowerpot cover, a fruit washer, a display stand, or the like. It has the feature of being stable in all its forms. When opened, it stands by itself. When closed, it is completely flat (Figure 3), and is of very small dimensions thus facilitating its storage after use.

The hereindescribed utensil can be made of wire of any metal, particularly galvanised or tinned iron wire. The wires may also be covered with an enamel or plastic paint.

The tubular parts 20 constituting the articulations of the wires 13 and 14 may be of metal or any other material, preferably a non-oxidisable material, especially plastic material.

All or some of the constituent elements may be covered, particularly with plastic material. In particular, the appearance of the utensil is improved by providing the handles 23 with a coloured covering.

The embodiment described and illustrated is of course in no way limitative and may be varied in various ways. In particular, depending on the effects desired and the uses proposed, the circles 10 and 11 may have the same or different diameters, while the greater diameter may be either at 10 or at 11. The assembly and crossing of the wires of the elements 13 and 14 may also vary as desired.

What I claim is:

A transferable utensil comprising a first annulus of metal receiving a trellis which constitutes the bottom of the utensil, a second annulus of metal having a diameter greater than the first said annulus, a first series of metallic widened-out U-shaped wires arranged in the form of an open trapezium, the lateral branches of successive U-shaped wires crossing each other and having their end portions articulated on the first metal annulus, a second series of metallic widened-out U-shaped wires arranged in the form of an open trapezium and having their lateral branches shorter [and more oblique] than those of the wires of the first series, the lateral branches of successive U-shaped wires of the second series crossing each other and having their end portions articulated on the said second metal annulus, the transverse bases of the widened-out U-shaped wires of the two series being connected pivotally to each other by tubular members whereby the utensil may be collapsed to form a flat body substantially in the plane of the trellis, a third series of widened-out U-shaped wires having the end portions of their lateral branches articulated on the second metal annulus with the branches of the successive wires crossing each other, and two substantially U-shaped handles having the end portions of their lateral branches articulated on the second metal annulus and having their branches passing respectively one on each side of the wires of the third series so that when the handles are brought together the loops are folded over to form a partial closure for the top of the utensil, and when the handles are moved apart the loops are moved away, thus the utensil can be opened for filling or emptying.

References Cited in the file of this patent or the original patent

UNITED STATES PATENTS

| | | |
|---|---|---|
| 820,716 | Haynes et al. | May 15, 1906 |
| 1,599,243 | Parker | Sept. 7, 1926 |
| 2,573,770 | Meadow | Nov. 6, 1951 |

FOREIGN PATENTS

| | | |
|---|---|---|
| 179,401 | Germany | Dec. 4, 1906 |
| 909,232 | France | Dec. 10, 1945 |